(12) United States Patent
Oh et al.

(10) Patent No.: US 9,300,775 B1
(45) Date of Patent: Mar. 29, 2016

(54) ATTACHABLE SMARTPHONE ON SMARTWATCH WITH OPEN-CLOSE FLEXIBLE SCREEN PANEL OF SMARTPHONE

(71) Applicants: Kwang Jin Oh, La Crescenta, CA (US); Loven Oh, Irvine, CA (US); Austin Oh, Azusa, CA (US); Heidi Oh, La Crescenta, CA (US)

(72) Inventors: Kwang Jin Oh, La Crescenta, CA (US); Loven Oh, Irvine, CA (US); Austin Oh, Azusa, CA (US); Heidi Oh, La Crescenta, CA (US)

(*) Notice: Subject to any disclaimer, the term of this patent is extended or adjusted under 35 U.S.C. 154(b) by 0 days.

(21) Appl. No.: 14/501,752

(22) Filed: Sep. 30, 2014

(51) Int. Cl.
H04B 1/38 (2015.01)
H04M 1/00 (2006.01)
H04M 1/21 (2006.01)
H04M 1/02 (2006.01)

(52) U.S. Cl.
CPC .............. H04M 1/21 (2013.01); H04M 1/0256 (2013.01)

(58) Field of Classification Search
CPC .......................... H04B 1/385; H04B 2001/3861
USPC ................ 455/550.1, 556.1, 557, 566, 575.1, 455/575.6, 90.3; 368/13
See application file for complete search history.

(56) References Cited

U.S. PATENT DOCUMENTS

| | | | | |
|---|---|---|---|---|
| 2008/0043575 A1* | 2/2008 | Fasciano | .............. | G04G 9/0076 368/13 |
| 2009/0219788 A1* | 9/2009 | Henley, Jr. | ........... | G04G 17/083 368/13 |
| 2009/0280861 A1* | 11/2009 | Khan | ................... | H04B 1/3827 455/556.1 |

* cited by examiner

Primary Examiner — Nguyen Vo
(74) Attorney, Agent, or Firm — John K. Park; Park Law Firm

(57) ABSTRACT

A mobile dual system includes an attachable smartphone, a smartwatch, a flexible screen panel, a first docking device, and a second docking device. The flexible screen panel is disposed on the front surface portion of the attachable smartphone for displaying image and video information, and the flexible screen panel is disposed so as to follow contour of the front surface portion of the attachable smartphone or so as to be deployed flatly over the front surface portion with an end portion anchored. The first docking device is provided on the rear surface portion of the attachable smartphone. The second docking device is provided on the front portion and the side wall portion of the smartwatch. The first and second docking devices are configured for attaching the attachable smartphone to and detaching the attachable smartphone from the smartwatch and disposing the attachable smartphone in directions on the smartwatch.

13 Claims, 12 Drawing Sheets

ATTACHABLE SMARTPHONE ON SMARTWATCH WITH OPEN-CLOSE FLEXIBLE SCREEN PANEL OF SMARTPHONE

REFERENCE TO RELATED APPLICATIONS

This application is a Non-provisional application of, and claims priority to U.S. Provisional App. Nos. 61/884,602 filed on Sep. 30, 2013, 61/887,792 filed on Oct. 7, 2013, 61/920, 434 filed on Dec. 23, 2013, 61/931,318 filed on Jan. 24, 2014, 61/942,562 filed on Feb. 20, 2014, and 61/978,166 filed on Apr. 10, 2014, all of which are hereby incorporated by reference.

BACKGROUND OF THE INVENTION

The present invention relates to a mobile dual system. More particularly, this invention relates to an attachable smartphone ON SMARTWATCH WITH OPEN-CLOSE FLEXIBLE SCREEN PANEL OF SMARTPHONE.

A need for a mobile dual system has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide an attachable smartphone ON SMARTWATCH WITH OPEN-CLOSE FLEXIBLE SCREEN PANEL OF SMARTPHONE.

A mobile dual system comprises an attachable smartphone, a smartwatch, a flexible screen panel, a first docking device, and a second docking device.

The attachable smartphone has a front surface portion, a rear surface portion, two side surface portions, and two end portions.

The smartwatch has a top portion and a side wall portion surrounding the top portion.

The flexible screen panel is disposed on the front surface portion of the attachable smartphone and configured for displaying image and video information, and the flexible screen panel is configured to be disposed so as to follow contour of the front surface portion of the attachable smartphone or so as to be deployed flatly over the front surface portion with an end portion anchored.

The first docking device is provided on the rear surface portion of the attachable smartphone.

The second docking device is provided on the front portion and the side wall portion of the smartwatch.

The first and second docking devices are configured for attaching the attachable smartphone to and detaching the attachable smartphone from the smartwatch and disposing the attachable smartphone in a plurality of directions on the smartwatch.

The mobile dual system may further comprise a fastener configured for attaching the flexible screen panel to the front surface portion.

The fastener may comprise first and second fastening portions, and each of them is disposed on the flexible screen panel and the end portion of the attachable smartphone.

The first and second fastening portions may comprise one or more magnets.

The mobile dual system may further comprise a receiving groove and a support bar.

The receiving groove is provided on the front surface portion of the attachable smartphone.

The support bar is anchored at a side of the receiving groove and configured for being received in the receiving groove and being deployed so as to prop the flexible screen panel at a rear side thereof.

The first docking device may comprise a round home, a plurality of spring holders, and one or more release buttons.

The round home is disposed on the rear surface portion of the attachable smartphone and configured for docking the top portion and the side wall portion of the smartwatch.

The plurality of spring holders are for locking onto the side wall portion of the smartwatch.

The one or more release buttons are disposed on the side surface portion, connected to the plurality of spring holders, and configured for releasing the plurality of spring holders so that the attachable smartphone is released free.

The second docking device may comprise a plurality of teeth grooves and a stop latch.

The plurality of teeth grooves are disposed on the side wall portion of the smartwatch and configured for docking and turning of the attachable smartphone thereon.

The stop latch is provided along the edge of the top portion of the smartwatch.

The flexible screen panel may be flat under no external force, and the flexible screen panel may be curved and received in the receiving groove when the fastener is fastened.

An end of the support bar may be anchored by an hinge provided at a corner of the receiving groove.

The end portion of the flexible screen panel may be anchored fixedly.

The support bar may be made of wire so as to fit in the receiving groove, and the support bar may comprise a supporting portion, two propping portions, and two hinge portions.

The supporting portion may be configured for contacting the rear surface of the flexible screen panel.

Each of the two propping portions may extend perpendicularly from the supporting portion and be curved so as to fit into the receiving groove.

Each of the two hinge portions extends perpendicularly from the corresponding propping portion and being configured for engaging to the edge of the receiving groove.

Each of the release buttons may be connected to two of the spring holders with two spring bars provided through two holes disposed in the attachable smartphone.

The flexible screen panel may further comprise a panel spring disposed on the rear surface of the flexible screen panel, and the panel spring may provide a recovering force when external force is removed from the flexible screen panel.

The advantages of the present invention are: (1) the attachable smartphone on smartwatch has a simple structure to realize; and (2) the attachable smartphone on smartwatch facilitates the usage dramatically.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
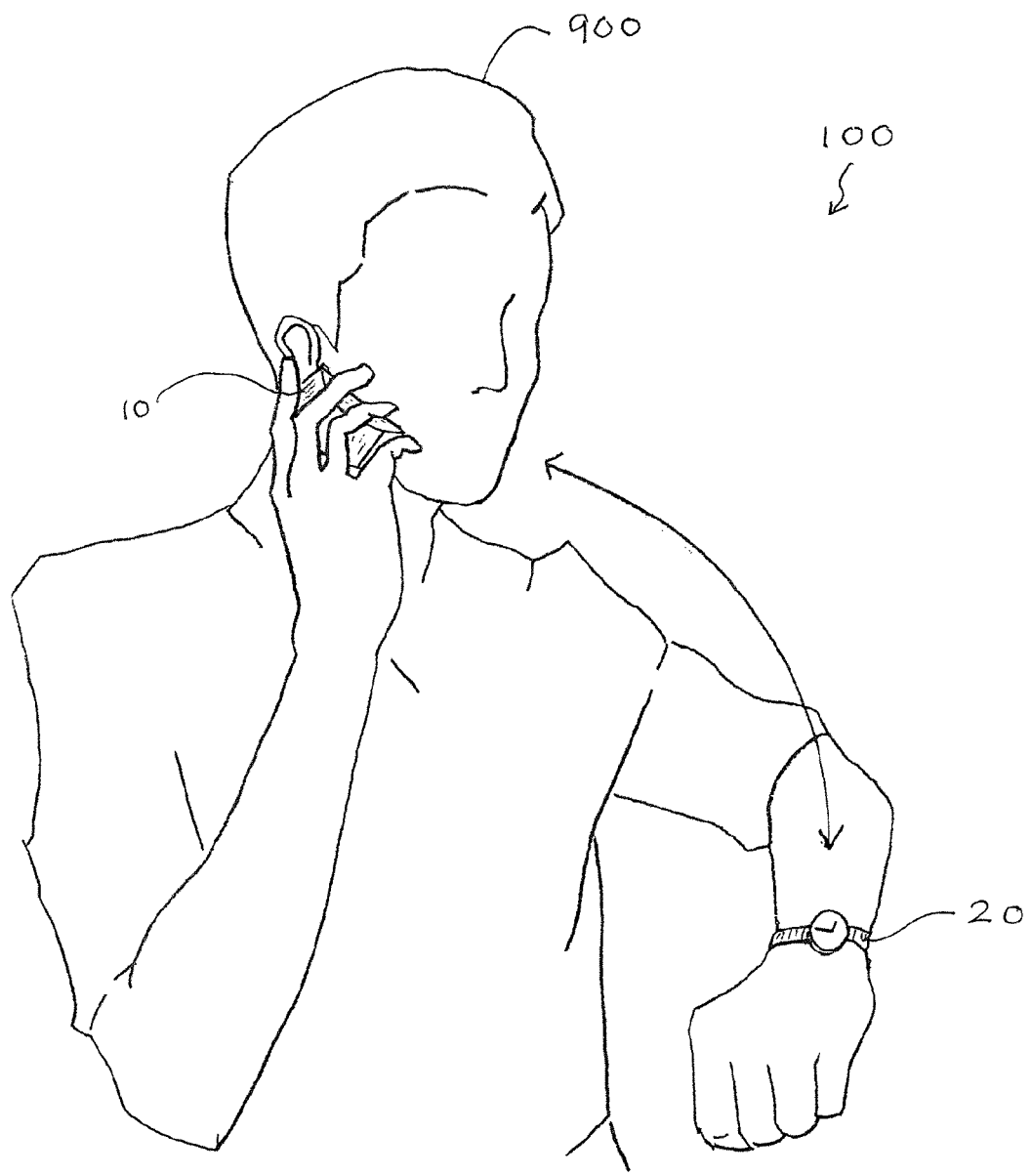
FIG. 1 is a perspective view showing a man using a detachable smartphone from Smartwatch with open-close flexible screen panel of smartphone according to an embodiment of the invention.

FIGS. 1 through 6 show attachable smartphones with smartwatches according to embodiments of the invention, and FIGS. 7 through 10 show detailed structures of parts according to another embodiments of the invention.

A mobile dual system 100 comprises an attachable smartphone 10, a smartwatch 20, a flexible screen panel 30, a first docking device 40, and a second docking device 50.

The attachable smartphone 10 has a front surface portion 12, a rear surface portion 14, two side surface portions 16, and two end portions 18.

The smartwatch 20 has a top portion 22 and a side wall portion 24 surrounding the top portion 22.

Figure 3:
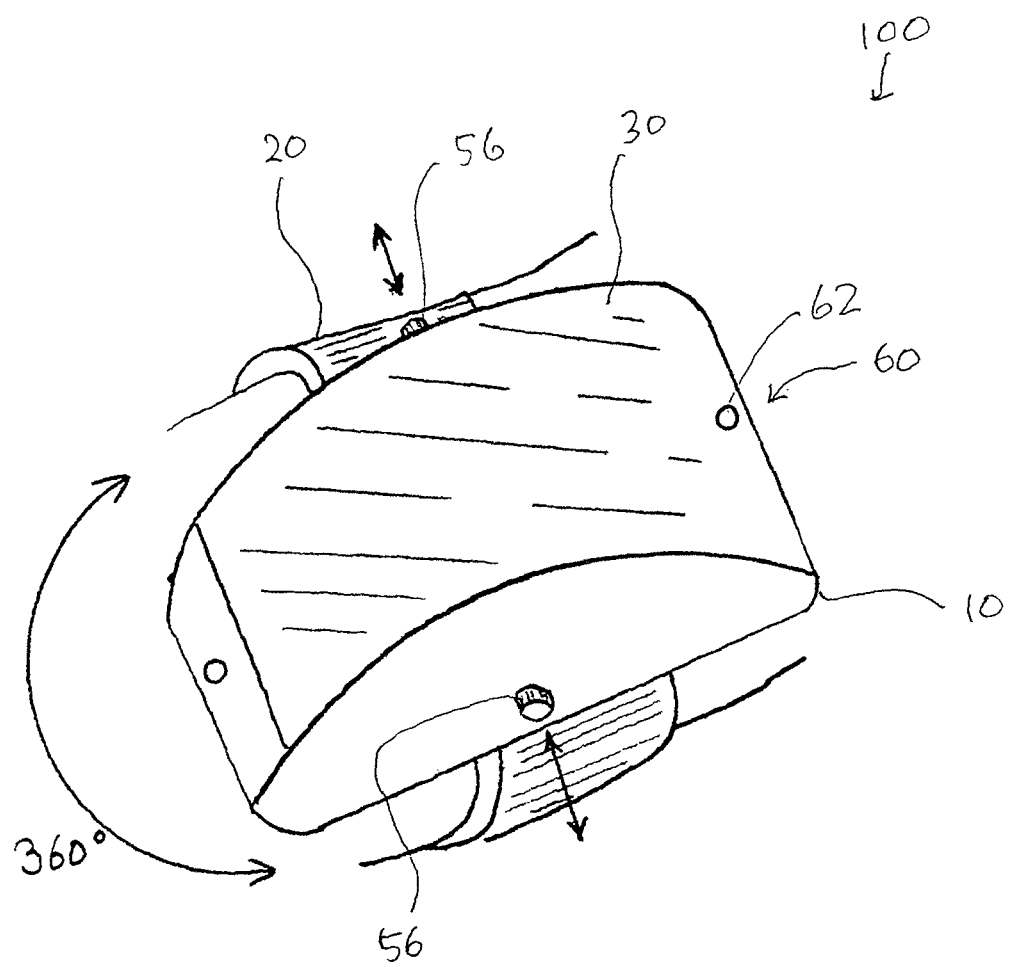
FIG. 3 is a perspective view of an attachable smartphone attached on smartwatch with closed flexible screen panel of smartphone according to still another embodiment of the invention.
Figure 7:
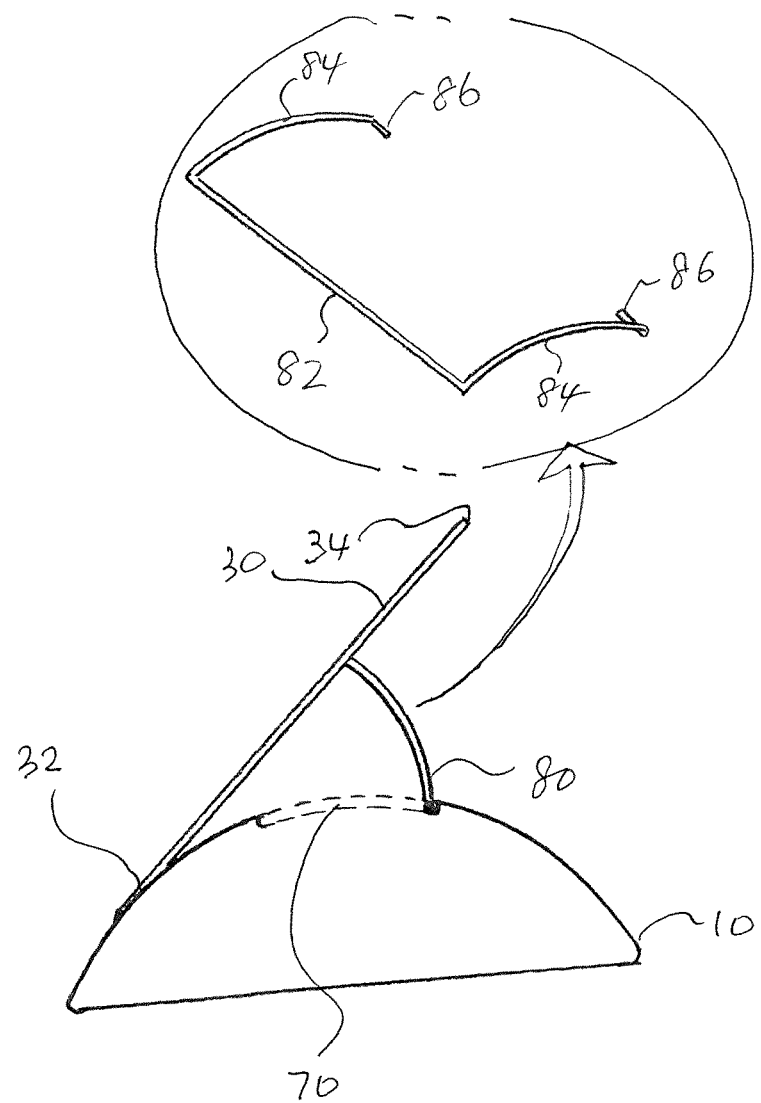
FIG. 7 is a perspective view of a flexible screen panel support bar of an attachable smartphone according to still another embodiment of the invention.

The flexible screen panel 30 is disposed on the front surface portion 12 of the attachable smartphone 10 and configured for displaying image and video information, and the flexible screen panel 30 is configured to be disposed so as to follow contour of the front surface portion 12 of the attachable smartphone 10 as shown in FIG. 3, or so as to be deployed flatly above the front surface portion 12 with an end portion 32 anchored as shown in FIG. 7.

The first docking device 40 is provided on the rear surface portion 14 of the attachable smartphone 10.

The second docking device 50 is provided on the front portion 22 and the side wall portion 24 of the smartwatch 20.

The first and second docking devices 40, 50 are configured for attaching the attachable smartphone 10 to and detaching the attachable smartphone 10 from the smartwatch 20 and disposing the attachable smartphone 10 in a plurality of directions on the smartwatch 20.

The mobile dual system 100 may further comprise a fastener 60 configured for attaching the flexible screen panel 30 to the front surface portion 12.

The fastener 60 may comprise first and second fastening portions 62, 64, and they are disposed on the flexible screen panel 30 and the end portion 18 of the attachable smartphone 10.

The first and second fastening portions 62, 64 may comprise one or more magnets. One or both of them may be magnets.

The mobile dual system 100 may further comprise a receiving groove 70 and a support bar 80.

The receiving groove 70 is provided on the front surface portion 12 of the attachable smartphone 10.

The support bar 80 is anchored at a side of the receiving groove 70 and configured for being received in the receiving groove 70 and being deployed so as to prop the flexible screen panel 30 at a rear side thereof by a specific angle.

The first docking device 50 may comprise a round home 52, a plurality of spring holders 54, and one or more release buttons 56.

The round home 52 is disposed on the rear surface portion 14 of the attachable smartphone 10 and configured for docking the top portion 22 and the side wall portion 24 of the smartwatch 20.

The plurality of spring holders 42 are for locking onto the side wall portion 24 of the smartwatch 20.

The one or more release buttons 56 are disposed on the side surface portion 16, connected to the plurality of spring holders 54, and configured for releasing the plurality of spring holders 54 so that the attachable smartphone 10 is released free.

The second docking device 60 may comprise a plurality of teeth grooves 62 and a stop latch 64.

The plurality of teeth grooves 62 are disposed on the side wall portion 24 of the smartwatch 20 and configured for docking and turning of the attachable smartphone 10 thereon.

The stop latch 64 is provided along the edge of the top portion 22 of the smartwatch 20.

The flexible screen panel 30 may be flat under no external force, and the flexible screen panel 30 may be curved and received in the receiving groove 70 when the fastener 60 is fastened.

An end of the support bar 80 may be anchored by an hinge provided at a corner of the receiving groove 70.

The end portion 32 of the flexible screen panel 30 may be anchored fixedly.

The support bar 80 may be made of wire so as to fit in the receiving groove 70, and the support bar 80 may comprise a supporting portion 82, two propping portions 84, and two hinge portions 86 as shown in FIG. 7.

The supporting portion 82 may be configured for contacting the rear surface of the flexible screen panel 30.

Each of the two propping portions 84 may extend perpendicularly from the supporting portion 82 and be curved so as to fit into the receiving groove 70.

Each of the two hinge portions 86 extends perpendicularly from the corresponding propping portion 84 and being configured for engaging to the edge of the receiving groove 70.

Figure 10:
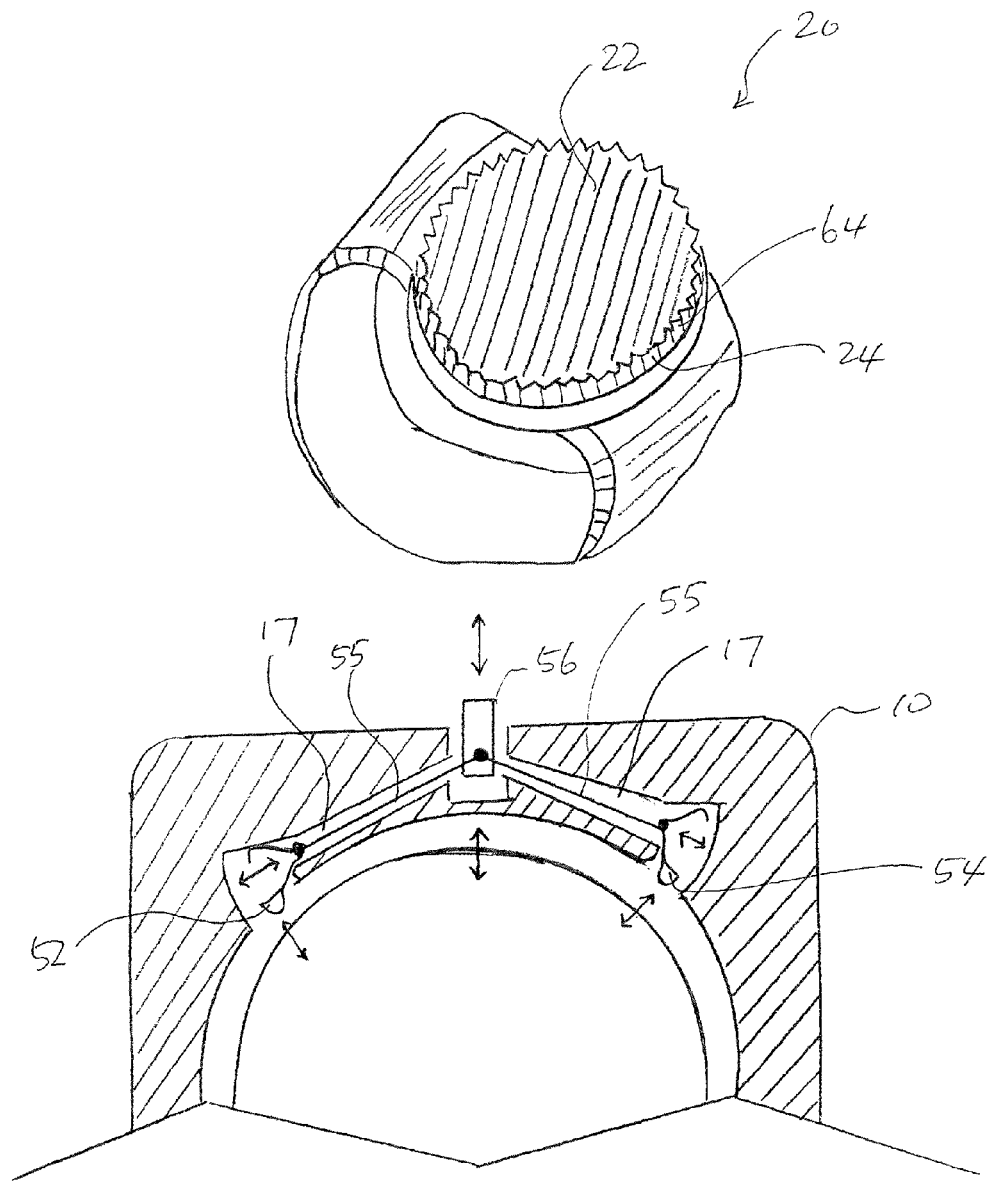
FIG. 10 is a cross sectional view of a smartwatch and an attachable smartphone with release button according to still another embodiment of the invention.

Each of the release buttons 56 may be connected to two of the spring holders 54 with two spring bars 55 provided through two holes 17 disposed in the attachable smartphone 10 as shown in FIG. 10.

Figure 8:
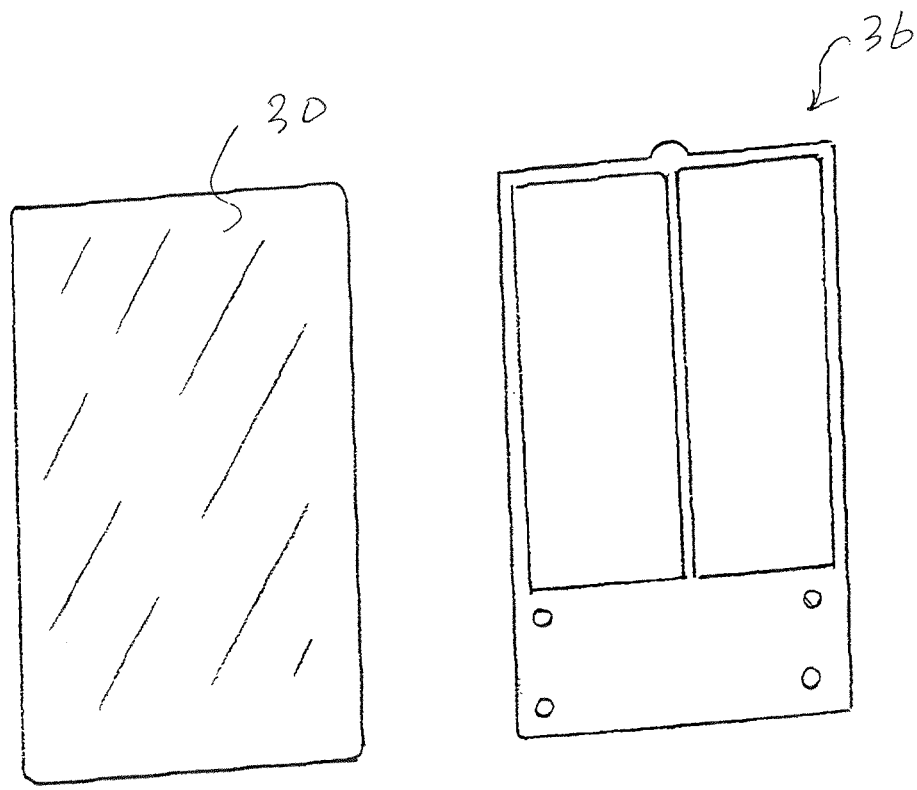
FIG. 8 is a view of a spring panel for flexible screen panel according to still another embodiment of the invention.
Figure 8:
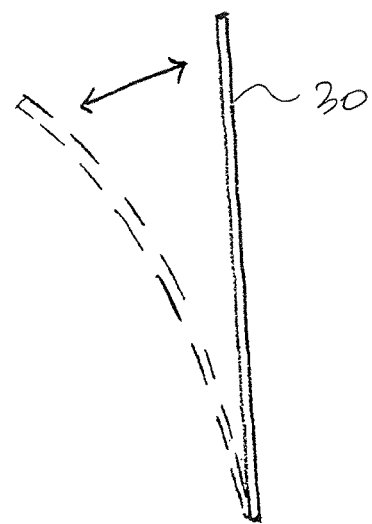

The flexible screen panel 30 may further comprise a panel spring 36 disposed on the rear surface of the flexible screen panel 30, and the panel spring 36 may provide a recovering force when external force is removed from the flexible screen panel 30 as shown in FIG. 8. The panel spring 36 may be attached to the flexible screen panel 30 fixedly in any means. And the shape of the panel spring 36 may be chosen appropriately according to material of the flexible screen panel 30 and the panel spring 36.

In certain embodiments of the invention, the receiving groove 70 may be configured for receiving the flexible screen panel 30 and the support bar 80 all together. An extra groove of the shape of the support bar 80 may be added to the receiving groove 70 for the flexible screen panel 30. Alternatively, the receiving groove 70 is for the support bar 70 only as shown in FIG. 7.

In FIG. 1, the man 900 uses the attachable smartphone 10 as detached from the smartwatch 20.

Figure 2:
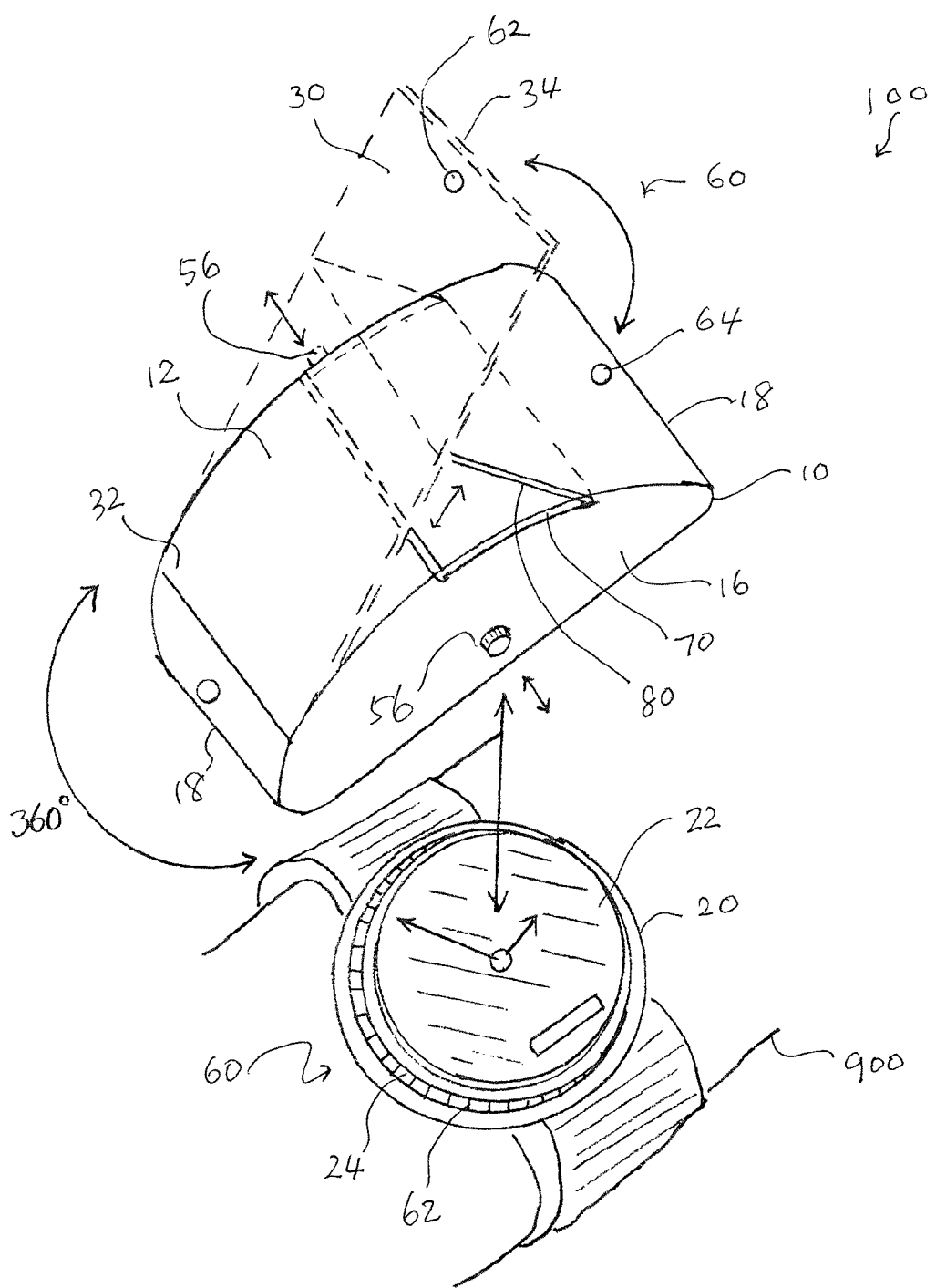
FIG. 2 is a perspective view of an attachable smartphone detached from a smartwatch with opened flexible screen panel of smartphone according to another embodiment of the invention.

As shown in FIG. 2, the attachable smartphone 10 can be attached to the smartwatch 20.

Figure 4A:
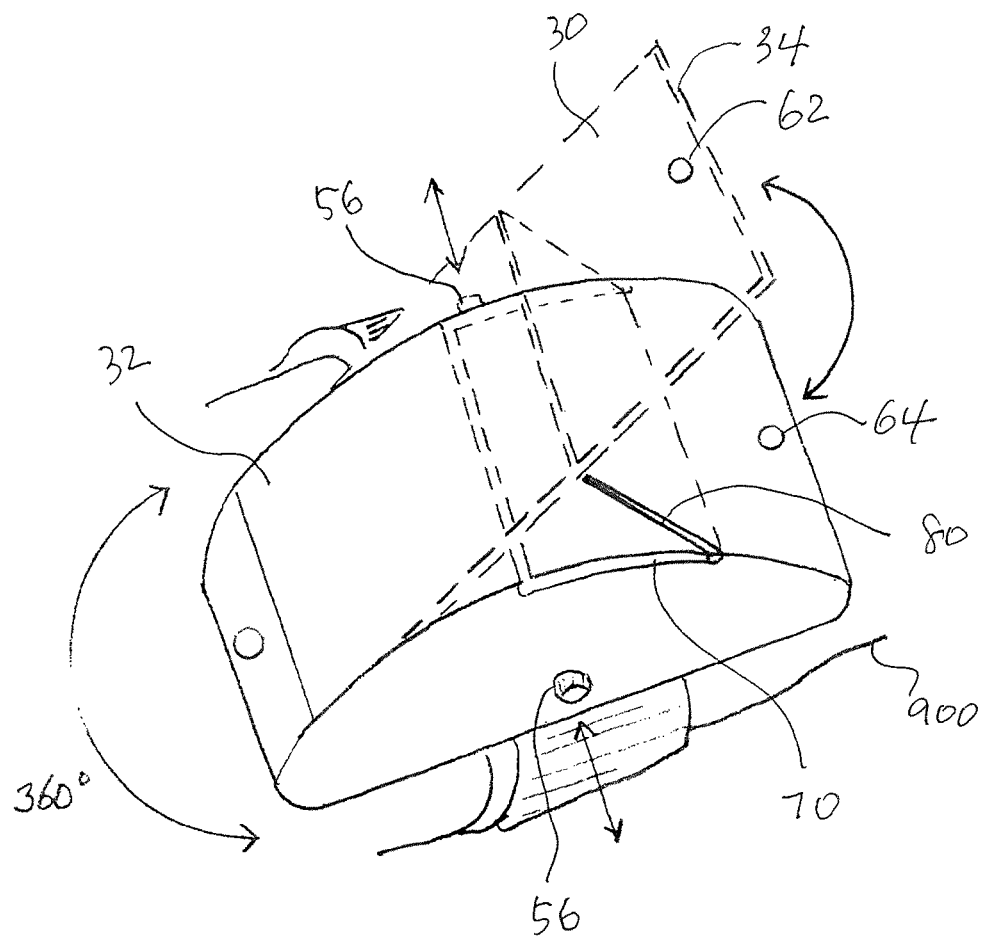
FIG. 4A is a perspective view of an attachable smartphone attached horizontally on smartwatch with opened flexible screen panel of smartphone according to still another embodiment of the invention.

Then, as shown in FIGS. 3 and 4A, one end of the flexible screen panel 30 may be detached from the front surface portion 12 and then used as a flat display.

Figure 4B:
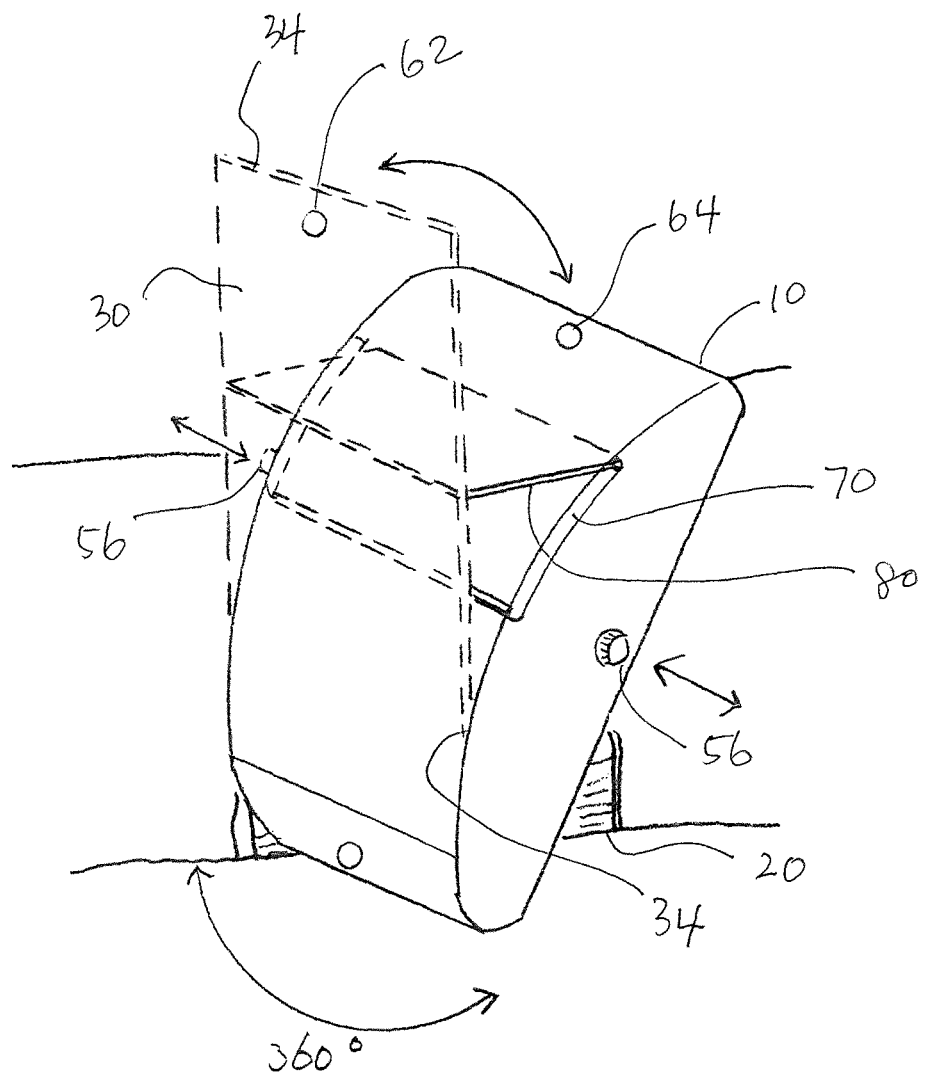
FIG. 4B is a perspective view of an attachable smartphone attached half-way vertically on smartwatch according to still another embodiment of the invention.
Figure 4C:
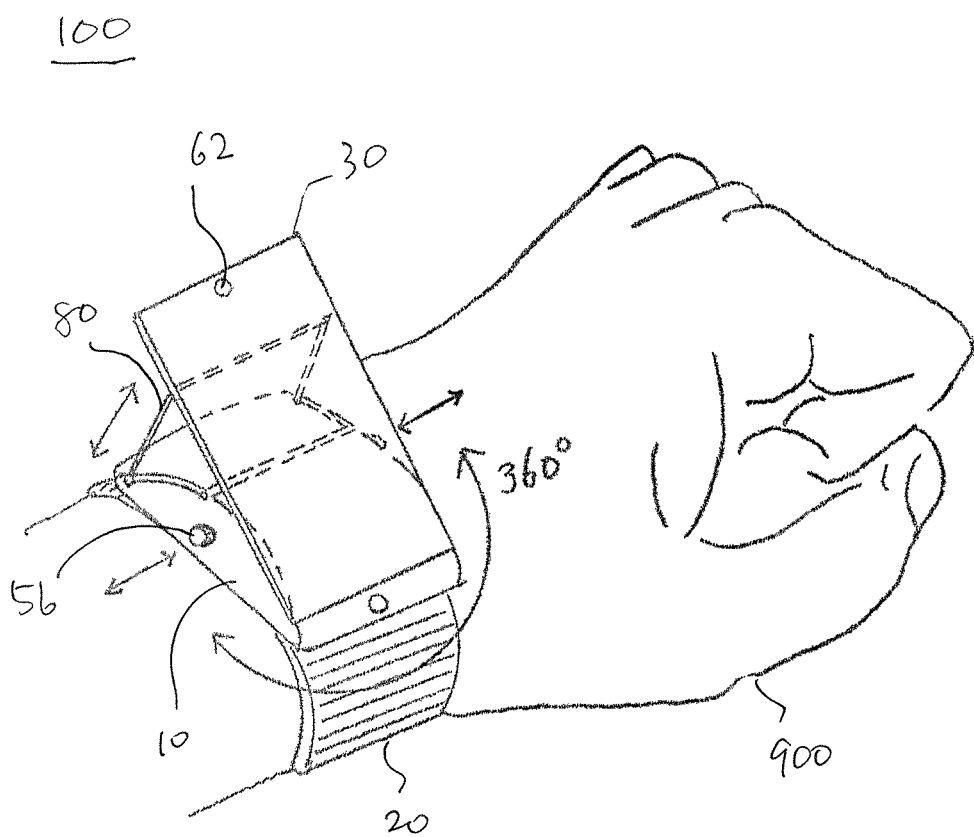
FIG. 4C is a perspective view of an attachable smartphone attached fully vertically on smartwatch according to still another embodiment of the invention.

Furthermore, the attachable smartphone 10 can be rotated to different directions. Such rotation can be obtained by pressing the buttons 56 and rotating the smartphone 10 by a desired angle, and then releasing the buttons 56 as shown in FIG. 4B when the rotation is half-way done, and in FIG. 4C when the rotation is done fully.

Figure 5:
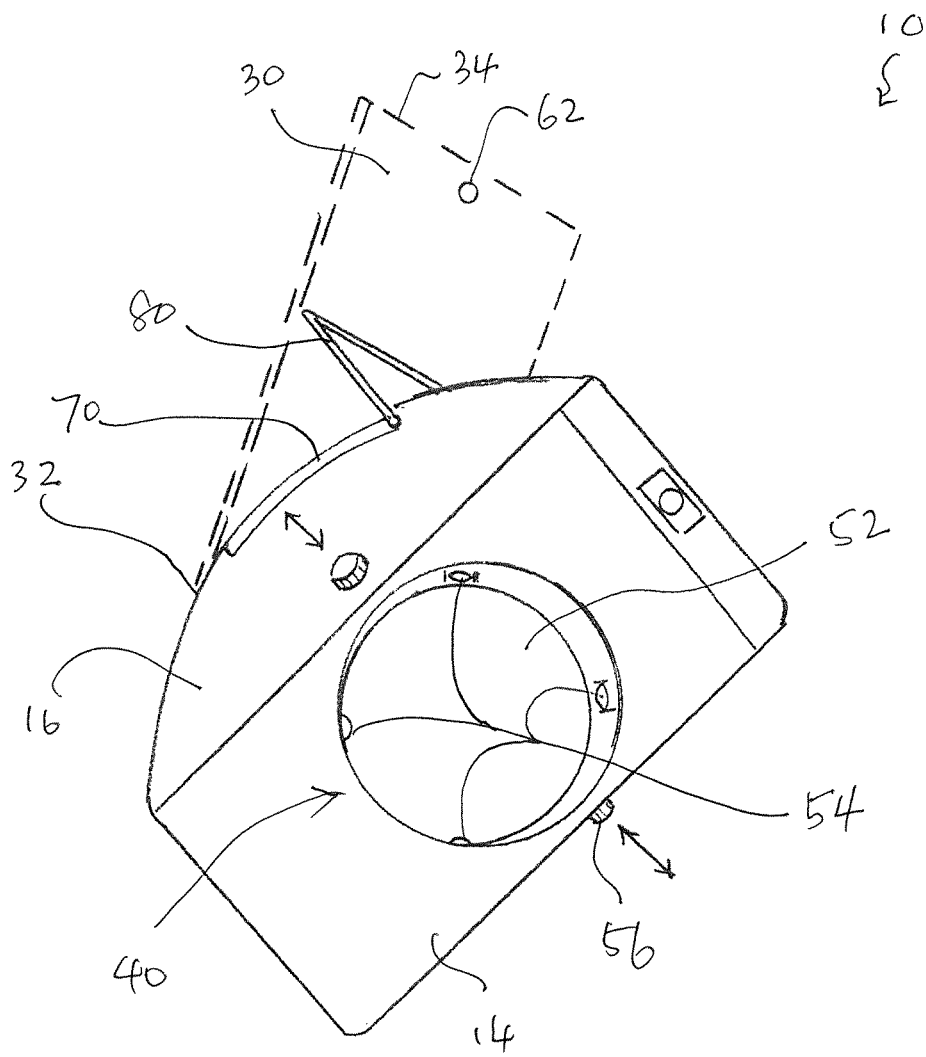
FIG. 5 is a bottom view of an attachable smartphone with opened flexible screen panel according to still another embodiment of the invention.
Figure 6:
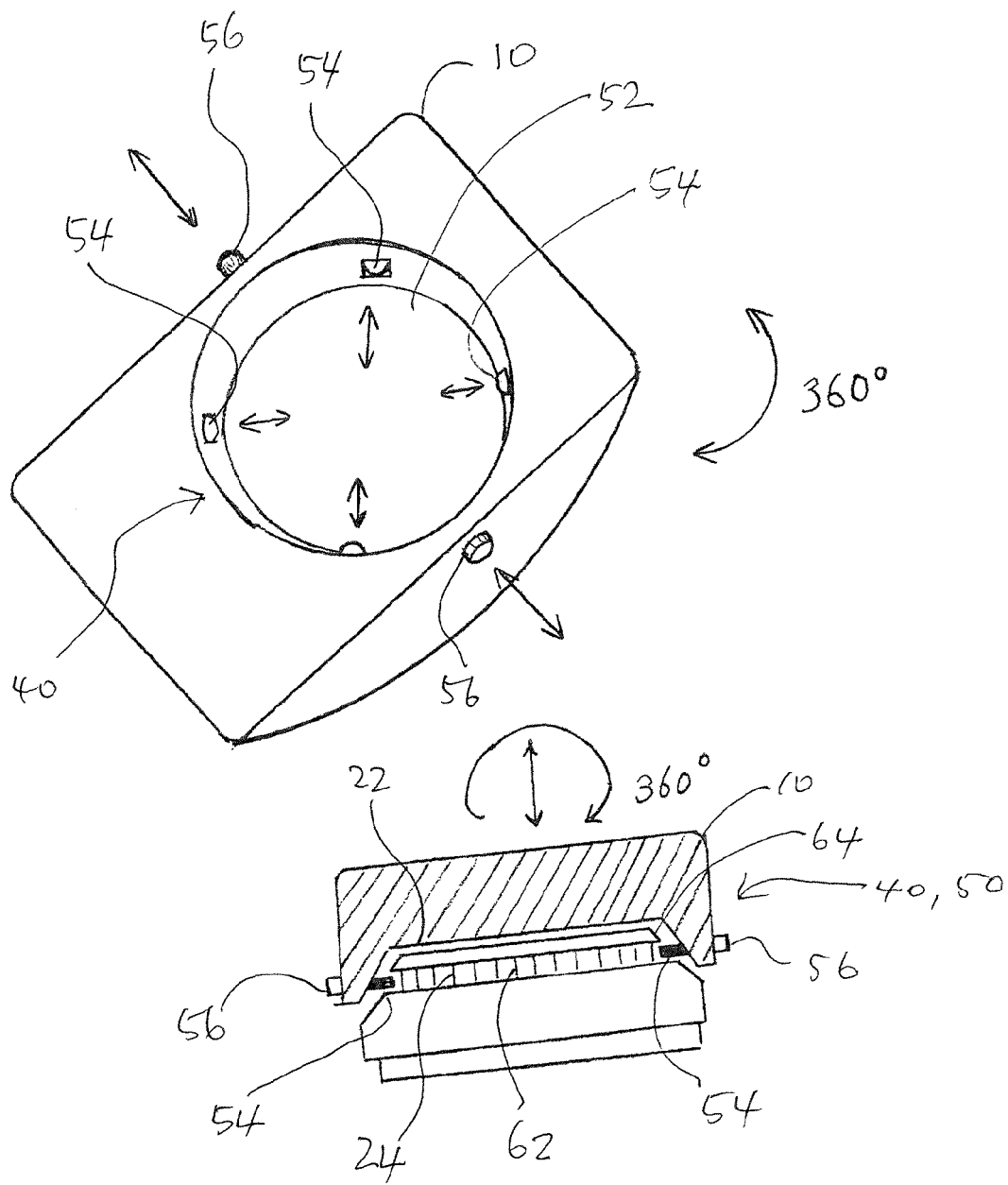
FIG. 6 is a cross sectional view of an attachable smartphone on smartwatch with open-close flexible screen panel of smartphone according to still another embodiment of the invention.

FIGS. 5, 6, and 10 show how the first and second docking devices 50, 60 work for docking action.

Figure 9:
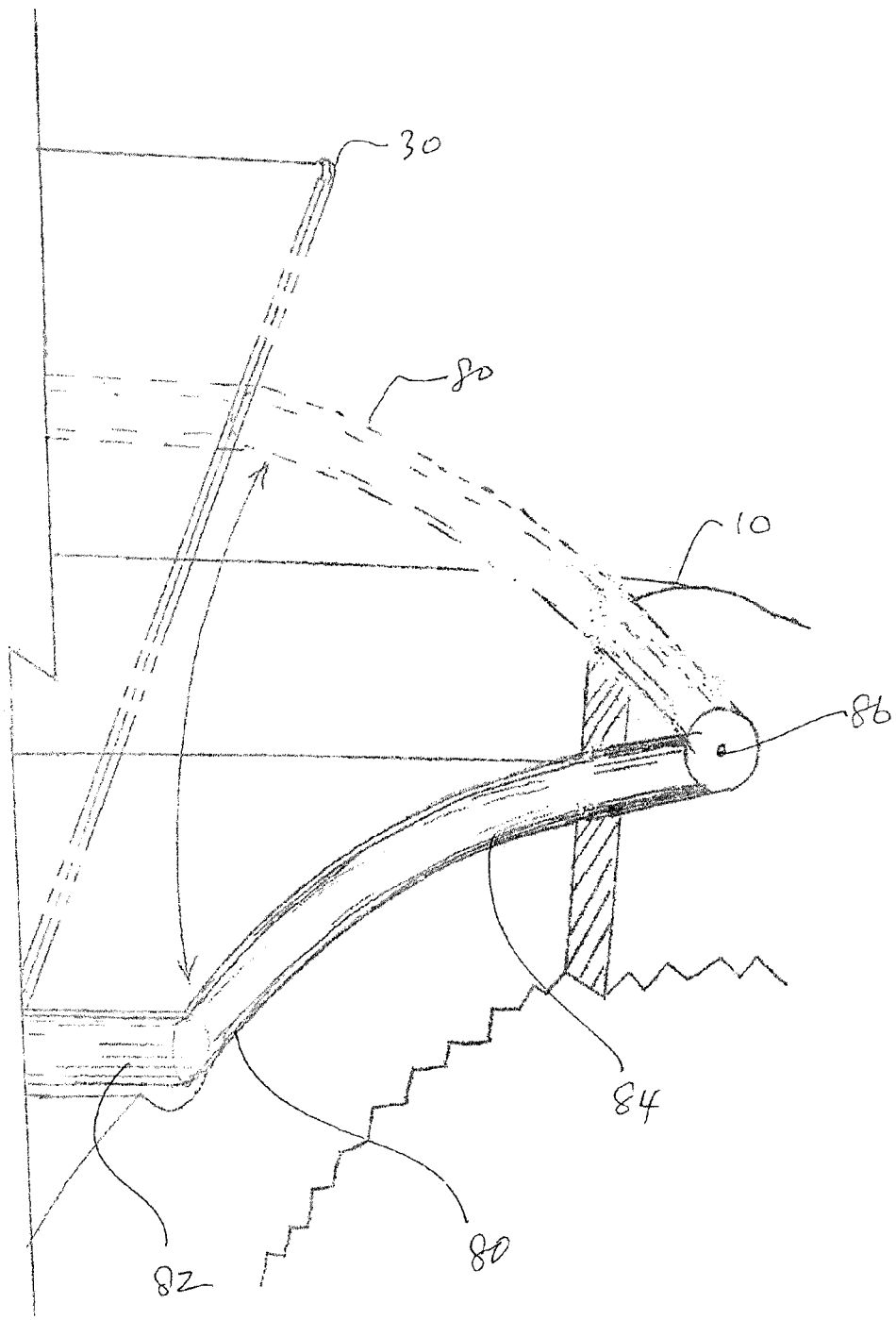
FIG. 9 is a view of a support bar and a teeth groove according to still another embodiment of the invention.

FIG. 9 shows the position of the support bar 80 when received in the receiving groove 70 in solid line, and when propping the flexible screen panel 30 in dashed line.

On the attachable smartphone 10, there may be controls and buttons for its own other purposes as shown in FIGS. 3-5.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A mobile dual system comprising:
    an attachable smartphone having a front surface portion, a rear surface portion, two side surface portions, and two end portions;
    a smartwatch having a top portion and a side wall portion surrounding the top portion;
    a flexible screen panel disposed on the front surface portion of the attachable smartphone and configured for displaying image and video information, wherein the flexible screen panel is configured to be disposed so as to follow contour of the front surface portion of the attachable smartphone or so as to be deployed flatly over the front surface portion with an end portion anchored;
    a first docking device provided on the rear surface portion of the attachable smartphone; and
    a second docking device provided on the top portion and the side wall portion of the smartwatch,
    wherein the first and second docking devices are configured for attaching the attachable smartphone to and detaching the attachable smartphone from the smartwatch and disposing the attachable smartphone in a plurality of directions on the smartwatch.

2. The mobile dual system of claim 1, further comprising a fastener configured for attaching the flexible screen panel to the front surface portion.

3. The mobile dual system of claim 2, wherein the fastener comprises first and second fastening portions, each of which being disposed on the flexible screen panel and the end portion of the attachable smartphone.

4. The mobile dual system of claim 3, wherein the first and second fastening portions comprise one or more magnets.

5. The mobile dual system of claim 4, further comprising:
    a receiving groove provided on the front surface portion of the attachable smartphone; and
    a support bar anchored at a side of the receiving groove and configured for being received in the receiving groove and being deployed so as to prop the flexible screen panel at a rear side thereof.

6. The mobile dual system of claim 5, wherein the first docking device comprises:
    a round home disposed on the rear surface portion of the attachable smartphone and configured for docking the top portion and the side wall portion of the smartwatch;
    a plurality of spring holders for locking onto the side wall portion of the smartwatch; and
    one or more release buttons disposed on the side surface portion, connected to the plurality of spring holders, and configured for releasing the plurality of spring holders so that the attachable smartphone is released free.

7. The mobile dual system of claim 5, wherein an end of the support bar is anchored by an hinge provided at a corner of the receiving groove.

8. The mobile dual system of claim 5, wherein the end portion of the flexible screen panel is anchored fixedly.

9. The mobile dual system of claim 5, wherein the support bar is made of wire so as to fit in the receiving groove, wherein the support bar comprises:
    a supporting portion configured for contacting a rear surface of the flexible screen panel;
    two propping portions, each of which extending perpendicularly from the supporting portion and being curved so as to fit into the receiving groove; and
    two hinge portions, each of which extending perpendicularly from the corresponding propping portion and being configured for engaging to an edge of the receiving groove.

10. The mobile dual system of claim 6, wherein the second docking device comprises:
    a plurality of teeth grooves disposed on the side wall portion of the smartwatch and configured for docking and turning of the attachable smartphone thereon; and
    a stop latch provided along the edge of the top portion of the smartwatch.

11. The mobile dual system of claim 6, wherein each of the release buttons is connected to two of the spring holders with two spring bars provided through two holes disposed in the attachable smartphone.

12. The mobile dual system of claim 1, wherein the flexible screen panel is flat under no external force, and wherein the flexible screen panel is curved and received in a receiving groove when a fastener is fastened.

13. The mobile dual system of claim 1, wherein the flexible screen panel further comprises a panel spring disposed on a rear surface of the flexible screen panel, wherein the panel spring provides a recovering force when external force is removed from the flexible screen panel.

* * * * *